Nov. 18, 1969  W. E. MILLER ETAL  3,479,119
EXPOSURE CONTROL APPARATUS

Filed June 2, 1966  5 Sheets-Sheet 1

FIG. 1

INVENTORS
DOUGLAS E. WEBB
WILLIAM E. MILLER
BY
ATTORNEYS

FIG. 2

INVENTORS
DOUGLAS E. WEBB
WILLIAM E. MILLER
ATTORNEYS

FIG. 5

INVENTOR.
DOUGLAS E. WEBB
WILLIAM E. MILLER

ATTORNEYS

FIG. 6

INVENTOR.
DOUGLAS E. WEBB
WILLIAM E. MILLER
ATTORNEYS 3,479,119
EXPOSURE CONTROL APPARATUS
William E. Miller, Salem, Ohio, and Douglas E. Webb, Webster, N.Y., assignors to Xerox Corporation, Rochester, N.Y., a corporation of New York, and Miller-Holzworth, Inc., Salem, Ohio, a corporation of Ohio
Filed June 2, 1966, Ser. No. 554,837
Int. Cl. G03b 27/76
U.S. Cl. 355—80                                             12 Claims

ABSTRACT OF THE DISCLOSURE

A contact printer having an automatic exposure control circuit utilizing a multitude of lamps each of which radiate onto a very small assigned incremental area of a negative while in contact with the sensitized duplicating material and which are extinguished separately and automatically after proper exposure is made for each incremental area.

The printer has an optical arrangement intermediate the lamps and the negative for directing the illumination from the lamps along the predetermined incremental area, and a plurality of photocells each in spatial alignment with one of the lamps and positioned relative to the incremental area. Each of the photocells and lamps are electrically coupled to one another by a control circuit having a capacitance therein. The capacitance has a stored voltage which is a function of the value of the transmissivity of the incremental area being exposed to thereby terminate the illumination of the area when a uniform exposure thereof has been made.

---

This invention relates to photography and more particularly to an automatic exposure control apparatus for contact exposure of fresh photographic stock from photographic negatives or transparencies.

In contact printing, as the name implies, a photographically sensitive duplicating film, paper, or the like is exposed while in physical contact with a negative to be reproduced. As used herein the term "negative" is intended to encompass an image transparency on which the image can be either negative or positive in a photographic sense. Obtaining a good print from a negative has in the past usually been a matter of trial and error based on the best judgment of highly experienced laboratory technicians. In other words a skilled technician inspects the negative and then adapts the printer to effect an exposure corresponding to the average density transmission characteristics of the image transparency. Needless to say, the job becomes increasingly difficult where there are wide variations in densities within the image transparency.

This technique of balancing the exposure to the varying densities of the image transparency will be referred to hereinafter as "dodging." One known way to accomplish dodging in a contact printer is by interposing an optical system made up of various reflecting mirrors and filters between a luminating source and the negative to selectively illuminate the negative as described in U.S. Patent 3,141,398. As can be readily appreciated, it is necessary to make painstaking adjustments in the optical system for every negative reproduced. Even with this inconvenience, the print is only as good as the judgment of the person who labors over the arrangement of the optics as already mentioned.

Still another dodging technique is to project several spaced lamps directly onto different areas of the negative and to extinguish each lamp after an average exposure according to a prior inspection of the negative. As in the case of other printer dodging, the quality of the print depends in large part upon the extent of human error, when approximating the exposure for the varying densities of the negative. Another disadvantage with the latter technique is that there is poor control over the illumination generated by the spaced lamps further detracting from the resolution of the print.

With the present day demand for the mass production of photographic exposures of the highest possible quality resolution and acuteness from roll film negatives having widely variable density characteristics, such as, those used in aerial photography the existing exposure systems are generally unsuitable.

Now in accordance with the present invention there is provided automatic exposure control apparatus for a contact printer enabling mass production of high quality prints from roll film negatives such as those used in aerial photography. Generally speaking, the present invention utilizes a multitude of lamps each of which radiate onto a very small assigned incremental area of the negative while in contact with the sensitized duplicating material and are extinguished separately and automatically after proper exposure is made for each incremental area. The overall effect is to produce a high quality print. More than this, the incremental illuminations cover the entire negative with controlled overlap so that there is no apparent patterning from the illuminating sources resulting in a very high resolution print.

Accordingly, it is an object of this invention to provide novel apparatus for exposing sensitized recording materials.

Accordingly, it is an object of this invention to provide a novel apparatus for forming prints from image transparencies.

It is another object of this invention to provide novel automatic exposure control apparatus for printing image transparencies.

It is a further object of this invention to provide a novel control apparatus for automatically varying the exposure time as a function of transitivity of image transparencies to be printed.

These and other features and objects of the invention will be apparent from the following description and from the drawings in which:

Figure 1:
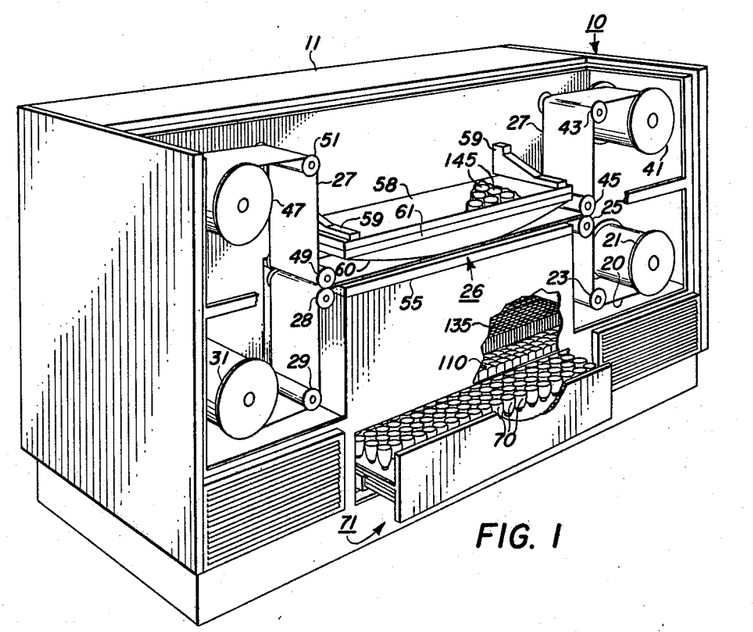
FIG. 1 is a perspective view of the contact printer apparatus in accordance with the invention with parts broken away to show more clearly internal structure.

Referring now to FIG. 1 there is shown a contact printer 10 having a light tight housing 11. Located within this housing is a length of negative 20 wound about a supply spool 21 from which the negative is advanced over rollers 23 and 25 to a printing zone 26 where an exposure is made while in overlying contact with a duplicating material 27. Rollers 28 and 29 assist in guiding the negative onto a take-up spool 31. In a similar operation, duplicating material 27, such as unexposed film stock, is advanced from a supply spool 41 over rollers 43 and 45 to the printing zone. From the printing zone it is guided onto a take-up spool 47 by rollers 49 and 51. It is intended that any suitable transport mechanism be used for advancing negative 20 and duplicating material 27 to and from the printing zone as this does not form a part of the present invention.

Situated just below negative 20 is a glass platen 55 which supports negative 20 and duplicating material 27 when they are placed in physical contact during exposure. To accomplish this contact, an inflatable transparent plastic air bag 60 supported by a frame 61 is located just above duplicating material 27. There is connected to bag 60 a source of compressed air 65 (FIGURE 2) through suitable valve control apparatus 62 of conventional design. Upon inflation of bag 60, duplicating material 27 is urged into pressure contact with negative 20 against platen 55. After exposure, air is allowed to escape from bag 60 to effect release of duplicating material 27 and negative 20. In this manner negative 20 and duplicating material 27 are held in firm contact during exposure but are freely transportable at all other times.

Frame 61 has rigidly secured to its perimeter a flat five-sided box-like structure 58 which provides suitable support for an array of photocells 145. This structure 58 may desirably be constructed of a dielectric material to which the photocells may be attached either by suitable adhesives or by mechanical clamps. As will be explained in greater detail hereinafter, photocells 145 are in substantal spatial alignment with respective exposure lamps 70. This alignment is provided by angle supports 59 which rigidly secure the box-like structure 58 to the rear panel of the housing 11.

Figure 2:
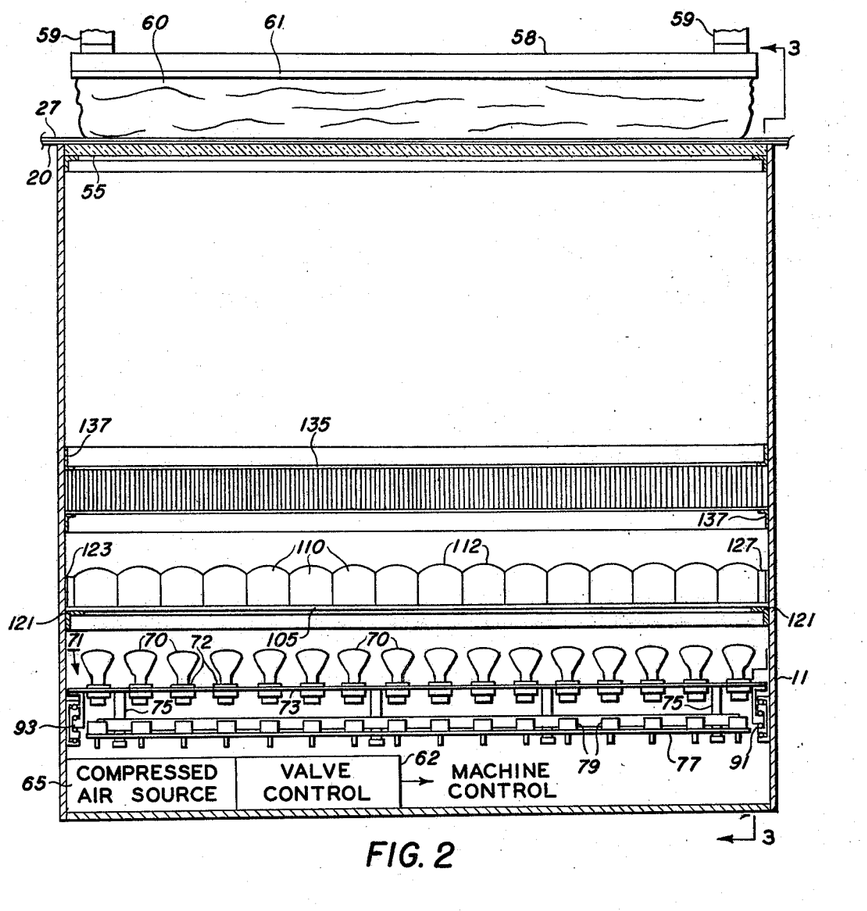
FIG. 2 is a side elevation view of the printing stage of the contact printer in accordance with the invention.
Figure 3:
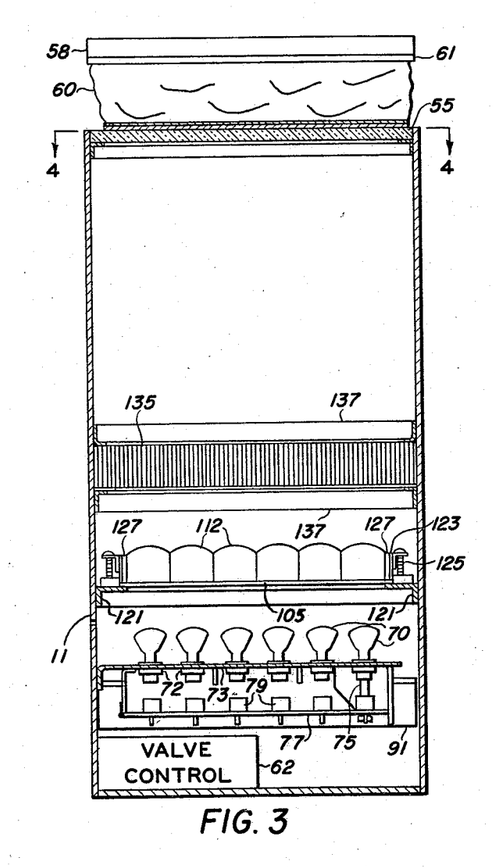
FIG. 3 is an end view of the printing stage taken along lines 3—3 of FIG. 2.

Referring now to FIGS. 2 and 3, an array of exposure lamps 70 are mounted in sockets 72 situated in closely spaced rows along the length and width of a support plate 73. If necessary, the array of lamps can be made slightly larger than the printing zone in order to provide uniform illumination at the edges thereof. Secured underneath plate 73 by brackets 75 is a shelf 77 for supporting potentiometers 79, one of which is provided for each lamp 70. The purpose of these potentiometers is to allow individual adjustment of illumination intensty of the exposure lamps in order to compensate for slightly varying lamp characteristics which may prevent uniform illumination over the printing zone. The relation between the potentiometers 79 and lamps 70 is shown in more detail in FIG. 6. To make the lamps 70 and potentiometer 79 more accessible, they are located in a slideout drawer 71 (FIG. 1). A pair of double glide members 91 and 93 in FIG. 2 support the plate 73 of the drawer in a sliding relation with the printer housing 11.

Figure 4:
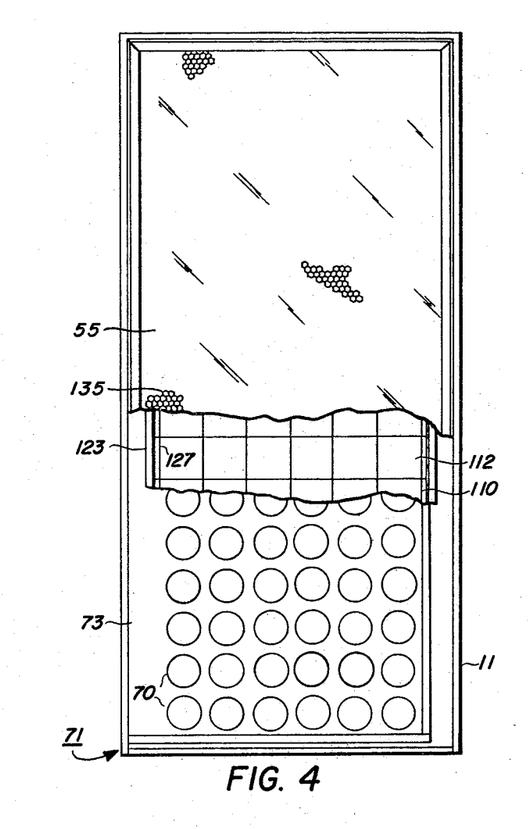
FIG. 4 is a view of the printing stage taken along lines 4—4 of FIG. 3.

In order to provide the desired incremental illumination, i.e., a smooth, blended transition from one incremental area of illumination to another, various optical apparatus may be used and are positioned between the lamps 70 and the negative 20. Referring still to FIGS. 2 and 3, a ground glass diffusion screen 105 supported by bracket 121 secured to housing 11 is spaced slightly above the exposure lamps 70 to diffuse the illumination generated by these lamps. In this manner, the illumination from the array of individual light sources 70 is blended by the diffusion effect at the screen 105 so that from the position of the negative 20, the exposure illumination appears as if it is coming from a continuous illuminating surface corresponding to the planar dimensions of diffusion screen 105. Diffusion screen 105 also supports an array of spherical lenses 110 (seen also in FIG. 4) having lens surfaces 112 which act to focus the diffused illumination passing through the diffusion screen 105 into a corresponding array of undiscernable adjacent areas of illumination at glass platen 55. The axis of each lens 110 is aligned with a corresponding exposure lamp 70. By way of the diffusion screen 105 and the lens array, a multiplicity of adjacent areas of illumination are present at the platen 55 and a slight decaying overlap of illumination between adjacent areas provide a smooth, blended transition from one light area to an adjacent area. In this manner, there will not be present at the platen 55 bands of more intense illumination than that of other areas nor will there be shadow patterns of very little or no light. The light areas at the platen 55 will be defined by the optical configuration of lens surfaces 112. This configuration of the lens surface as will as the diameter of the exposure lamps 70 depend primarily upon the dimensions of the negative and the printing zone at platen 55 as well as the number of exposure lamps 70 to be used.

A tungsten filament lamp is generally suitable as a source of exposure illumination, for example, General Electric Co. #1385. Any choice of lamps, however, should depend upon the spectral sensitivity of the emulsion of the duplicating material 27, the required printing speed, lamp life, heat generated by the lamp and contamination of components upon lamp breakage among other factors.

As shown in FIGURES 2 and 3, the diffusion screen 105 is supported horizontally on angle bracket 121 secured to the internal surface of housing 11. Lenses 110 are mounted on top of screen 105 in a rectangular framework 123 which is fixed to bracket 121 by clamping screws 125. Spacers 127 are provided for separating lenses 110 from framework 123.

If desired, a filter may be placed intermediate screen 105 and lenses 110 to provide illumination of the negative by selective wavelengths from the radiation spectrum. Thus where the duplicating material 27 is overly sensitive to illumination in the blue band of the spectrum, an orange filter may be used to reduce the intensity from this band of illumination.

To collimate the illumination emergent from lenses 110, a honeycomb-like structure 135 is positioned between the lenses 110 and the platen 55 so that the axis of any opening in the honeycomb-like structure is parallel to a line through the axis of any lens 110 and its respective exposure lamp 70. This structure 135 is supported in this position by brackets 137 and may be constructed from any suitable material, such as aluminum. Desirably this structure has a surface color and texture to effect total internal reflection of the emergent illumination from lenses 110.

Since the entire negative 20 is illuminated simultaneously, but incrementally, area by area, there is a slight overlap of illumination between adjacent areas. This illumination overlap is desirable since, in its absence, those spaces between incremental areas of illumination would appear as bands of shadow and patterning would result, i.e., the incremental areas of illumination are individually discernible. Therefore with this overlapping of illumination the multitude of individual area illuminations combine to provide a larger area of illumination, coextensive with the area of the negative to be printed, having a uniform intensity throughout.

In accordance with the present invention, each of the lamps 70 is illuminating for a controlled time to effect exposure of a corresponding incremental area of duplicating material 27 through a coextensive area of the negative 20. This may be seen in greater detail with reference to FIGS. 5 and 6.

Figure 5:
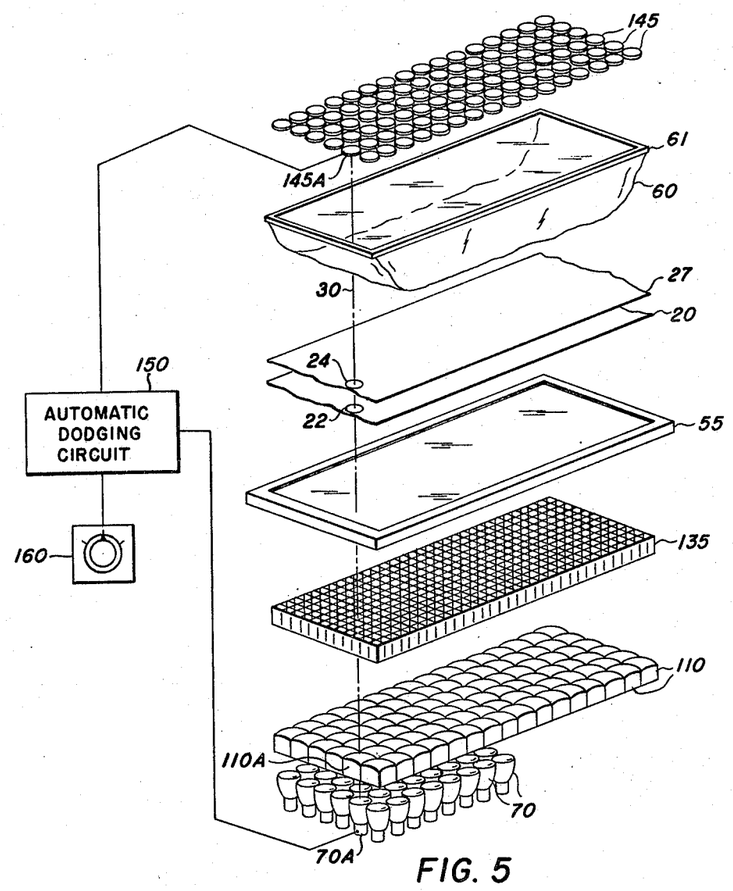
FIG. 5 is an exploded view of the printing stage shown with connections to an automatic dodging circuit in accordance with the invention.

In FIG. 5 there is an exploded illustration of the printing stage of the printer showing only one connection from a photocell 145A through an automatic dodging circuit 150 to a corresponding exposure lamp 70A. As shown by the broken line 30, photocell 145A is in spatial alignment not only with the exposure lamp 70A but also with a lens 110A and incremental areas 22 and 24, respectively, of the negative 20 and the duplicating material 27.

It is understood that suitable mechanical structure, such as the housing 11, brackets 121 and 137, and supports 59 provide adequate registration between the lamps 70, lenses 110, and photocells 145.

The illumination from the exposure lamp 70A after passing through diffusion plate 105 (not shown in FIG. 5), lens 110A, honeycomb-like structure 135, platen 55, and negative area 22 exposes duplicating material area 24. This exposing illumination then passes through duplicating material area 24 and air bag 60 and is received by the photocell 145A. As will be described in more detail in regard to FIG. 6, the photocell 145A in conjunction with the automatic dodging circuit 150 measures in effect the amount of illumination to which duplicating material area 24 is subjected. After a predetermined amount of exposure, a signal from the circuit 150 turns the exposure lamp 70A off thereby terminating the exposure of area 24. It is understood that this structure and procedure is identical for each photocell 145 and its respective exposure lamp 70.

The surfaces of the photocells 145 upon which the emergent illumination from air bag 60 is incident are reflective to a certain extent. This reflective characteristic can direct reflections of this incident illumination from the photocells 145 through the air bag 60 to the duplicating material 27 thereby causing unwanted exposure thereof. In order to eliminate the possibility of this undesirable exposure, the air bag 60 is made of a red transparent material which permits only the red wavelengths of visible light to pass to the photocells 145. By using a duplicating material which is insensitive to red illumination, the reflections from the photocell surfaces have no harmful effect on the duplicating material. With this precaution against undesirable reflections, it is necessary to employ photocells which are sensitive to illumination in the red range of the visible light spectrum.

Referring now to the automatic dodging circuit of FIG. 6 which was illustrated as block 150 in FIG. 5, the operation of this circuit will be described from the beginning of an exposure cycle. It should be understood that detailed examination need only be made of the control circuit associated with one exposure lamp and its respective photocell since identical circuits are used with each exposure lamp 70.

Prior to the actual exposure of the duplicating material area 24 through a negative area 22 in contact therewith, the exposure lamp 70A is in a state of non-illumination. Being an incandescent lamp, the filament of this lamp 70A is substantially at room temperature since only a very small amount of current, if any, passes therethrough. This initial current condition in the filament is due to the non-conductive state of the transistor Q8 which has its collector electrode 201 connected directly to one side of the filament and the high value of the resistor R1 connected across the emitter-collector of the transistor Q8. It is understood that diode CR1 is back biased by the positive potential applied at terminal 202 when the transistor Q8 is non-conducting.

Figure 6:
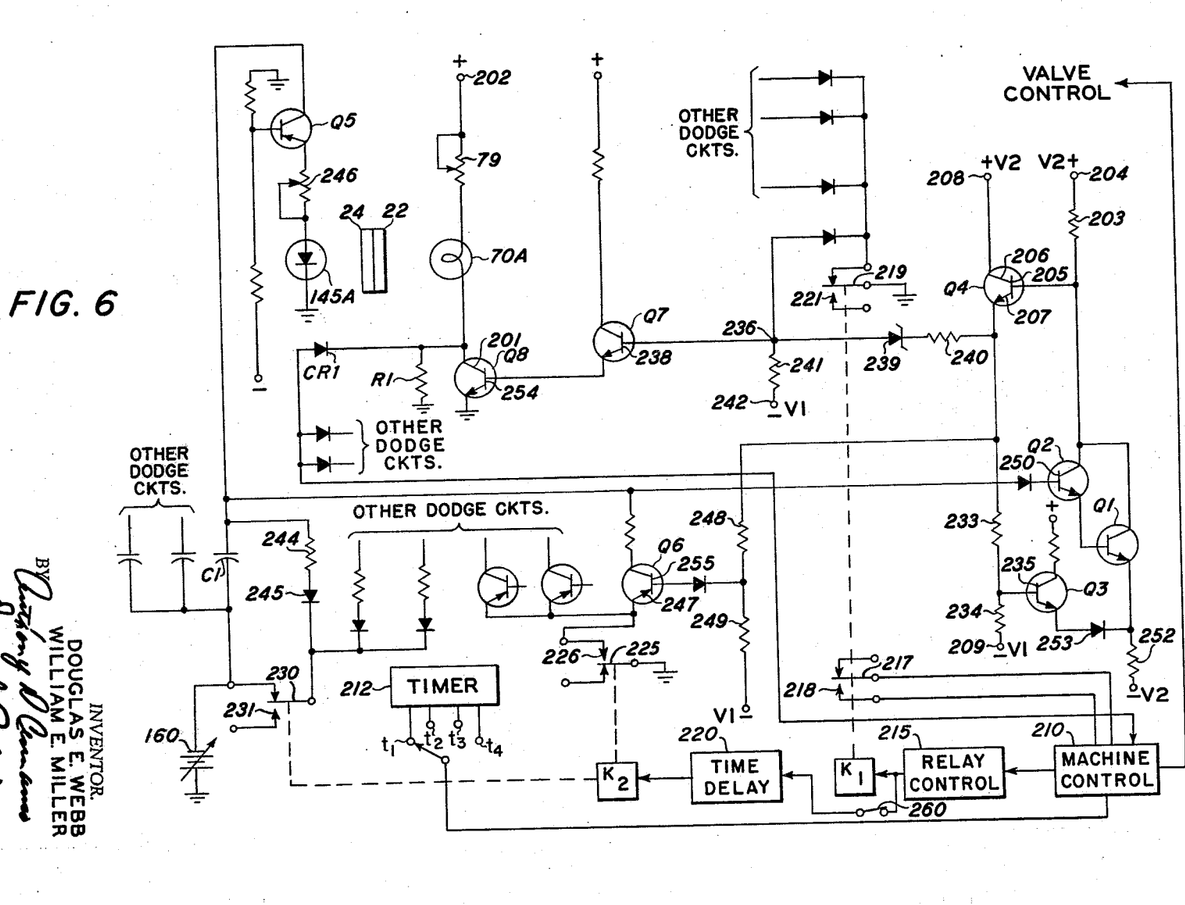
FIG. 6 is a schematic wiring diagram of the automatic dodging circuit.

Of the transistors shown in FIG. 6, only transistors Q4 and Q3 are biased in their conductive regions during the time prior to the actual exposure step. The NPN transistor Q4 is biased in its conducting region by a suitable positive potential V2 applied through the resistor 203 to its base electrode 205 from a terminal 204. Its collector electrode 206 and emitter electrode 207 are coupled to suitable positive and negative potentials V2 and —V1 applied at terminals 208 and 209, respectively.

The NPN transistor Q3 is conducting as a result of the voltage drop across the voltage divider including resistors 233–234 which supplies a positive bias to its base electrode 235. Except for the aforementioned transistors Q3 and Q4, the transistors in the circuit of FIG. 6 are biased off or in their non-conducting regions.

Machine control circuit 210 is shown in block form in FIG. 6 and may comprise a series of conventional switches which are inter-related with each other as well as with other parts of the schematic as shown in FIG. 6 to perform several functions as will be more fully outlined hereinafter.

Upon energization by suitable switch means (not illustrated), the machine control circuit 210 provides a signal to the valve control apparatus 62 (shown in FIG. 2) to initiate inflation of air bag 60 (FIG. 2) by air from the compressed air source 65 (FIG. 2). Before the inflation of the air bag 60 it will be understood that the duplicating material 27 and negative 20 (FIG. 2) have been transported to the printing zone of the apparatus and are ready for the exposure step.

Machine control circuit 210 also provides a signal to a conventional relay control circuit 215 which activates relay K1 after a suitable inherent time delay in the relay control circuit 215. This time delay is designed to permit full inflation of the air bag 60 (FIG. 2) before the relay K1 is activated in order to insure complete and adequate contact between the duplicating material area 24 and the negative area 22 before the exposure lamp 70A begins illuminating.

Once the relay K1 is energized, relay arms 217 and 219 are simultaneously activated to change from their normal positions, as shown in FIG. 6, to a position of contact with actuated terminals 218 and 221, respectively.

In the case of the relay arm 217, the two output terminals from the machine control circuit 210 are shorted by the arm 217 when it contacts the actuated terminal 218. This provides in effect an input signal to the machine control circuit 210 indicative of the condition of the air bag 60 (FIG. 2) which causes the machine control circuit 210 to provide a command signal which activates the valve control apparatus 62 associated with the air bag 60 and the compressed air source 65 (FIG. 2) to maintain the air bag 60 in its inflated state.

With the activation of the relay arm 219, the ground potential to which this arm is connected is switched from a junction 236 to the actuated terminal 221. This junction 236 is directly connected to the base electrode 238 of the NPN transistor Q7 as well as to the emitter electrode 207 of the NPN transistor Q4 through a Zener diode 239 and a resistor 240. In addition, this junction 236 is also connected through a resistor 241 to a suitable negative potential —V1 applied at a terminal 242. As the potential at the junction terminal 236 abruptly changes from ground potential to the negative potential applied at the terminal 242 upon the movement of relay arm 219, the Zener diode 239 is back biased in its Zener breakdown region thereby permitting current flow from the emitter electrode 207 of the transistor Q4 across the resistor 240 to the terminal 242. This flow of current across the resistor 242 provides a suitable positive bias to the base electrode 238 of the transistor Q7 to cause this transistor to conduct heavily. This heavy conduction provides suitable base current to the base electrode 254 of the NPN transistor Q8 and it too begins heavy conduction thereby effectively acting as a short-circuit across the resistor R1. As the transistor Q8 begins conduction, current begins to flow through the exposure lamp 70A raising the filament temperature thereby causing light emission therefrom.

Light emitted from the exposure lamp 70A passes through the negative area 22 and the duplicating material area 24 (as well as post-lamp optics and the air bag 60, not shown in FIG. 6) and influences the photocell 145A which, in the absence of incident light, is effectively an open circuit.

As the filament rises in temperature, light is received by the photocell and its resistance begins to decrease permitting the PNP transistor Q5 to conduct current which, in the absence of the parallel branch of a resistor 244, a diode 245, and the relay arm 230 across the capacitor C1, would act to charge this capacitor.

The initial illumination from exposure lamp 70A before its tungsten filament reaches full color temperature is predominately in the red wavelength region of the spectrum. Therefore, the photocell 145A "sees" what only appears to be intense exposure illumination and consequently reduces its resistance providing charging current for capacitor C1. However, in order to prevent this premature charging of the capacitor C1 and to insure that the charging of this capacitor begins when the exposure lamp 70A has reached its color temperature at which suitable exposure light is emitted, a by-pass branch for the charging current is provided by the series connection of a resistor 244 and a diode 245 which is selectively connected in parallel with the capacitor C1 by way of relay arm 230 when it is in its normal position as shown in FIG. 6. When this relay arm is activated to contact actuator terminal 231, the capacitor C1 will charge to a prescribed voltage level in the presence of charging current through a charging circuit including photocell 145A, a rheostat 246, the transistor Q5, and variable voltage source 160.

Relay arm 230 is activated to contact terminal 231 when the relay K2 is energized which occurs after the time delay of a conventional time delay circuit 220 expires. By design, this time delay is sufficient to permit the exposure lamp 70A to reach its color temperature once the transistor Q8 is conducting. Time delay circuit 220 is energized by a signal from relay control circuit 215.

In summary then, the exposure lamp 70A is turned on and permitted to reach its color temperature before any voltage is permitted to build up on the capacitor C1.

It will be noted that the energization of the relay K2 also effects activation of relay arm 225, shown in FIG. 6 in its normal position, to contact an actuated terminal 226 thereby placing ground potential on the emitter electrode 247 of the PNP transistor Q6. However, with the transistor Q4 conducting, the voltage across the voltage divider 248 and 249 suitably biases the base electrode 255 of the transistor Q6 such as to maintain this transistor in a non-conducting condition.

Continuing with the description of the automatic dodging circuit, it will be seen that once the time delay of time delay circuit 220 expires and the relay arm 230 is activated, the capacitor C1 begins charging to a potential generally indicative of the amount of light which has been received by photocell 145A.

More specifically, given a specified voltage level to which the capacitor C1 is to be charged, the time required for this voltage level to be reached is dependent, in the first instance, on the magnitude of the current charging this capacitor. In turn, this magnitude of the charging current depends upon the capacitance of the capacitor, the resistance of the charging circuit, and the voltage across the charging circuit. In the particular case of capacitor C1, the capacitance can be considered to be constant as well as the voltage across the charging circuit. The nominal resistance of the transistor Q5 and the resistance of the rheostat 246, once adjusted, will both be constant. Therefore, the only variable resistance in the charging circuit will be the resistance of the photocell 145A which decreases in resistance as a function of the intensity of light incident thereon. The intensity of this incident light can be considered as a function of the transmissivities of the duplicating material area 24 ($T_F$), the negative area 22 ($T_N$), the air bag 60 ($T_B$), and the post-lamp optics ($T_O$) such as diffuser plate 105, etc., as well as a function of the illumination ($H_S$) from the exposure lamp 70A. Of these factors, all may be considered as constants for a given negative area 22. From negative to negative only $T_N$, the transmissivity of the negative area, will vary and accordingly vary the intensity of the incident light on the photocell 145A. Therefore, given a specific voltage level to which the capacitor C1 is to be charged, the time required for this voltage level to be reached is a direct function of the transmissivity of the negative area 22.

Analytically, this dependency on the negative transmissivity of the desired voltage level on the capacitor can be written as:

$$V_E = \frac{1}{C1} \int_0^{t_E} T_B T_F T_O H_S K_1 K_2 T_N dt \quad (1)$$

where $V_E$ is the desired voltage level on capacitor C1 which will effect cessation of illumination from the exposure lamp, $K_1$ and $K_2$ are constants associated with the photocell 145A and the transistor Q5, and $t_E$ is the required exposure time.

It is readily seen that for one particular negative area 22, the factors in the intergrand are constant so the expression (1) may be expressed as:

$$V_E = \frac{1}{C1} (T_B T_F T_O H_S K_1 K_2 T_N t_E) \quad (2)$$

and from expression (2), the exposure time can be expressed as:

$$t_E = \left[ \frac{V_E Cl}{T_B T_F T_O H_S K_1 K_2} \right] \frac{1}{T_N} \quad (3)$$

Expression (3) demonstrates the significance of the transmissivity ($T_N$) of the negative area 22 in determining the exposure time ($t_E$) during which the exposure lamp 70 is illuminating.

As the transmissivity of the negative area 22 increases, the exposure time decreases and the capacitor C1 reaches the desired voltage level faster. As this transmissivity decreases, the exposure time increases as the capacitor takes longer to charge to the desired level.

The value for $t_E$, the exposure time, in expressions (1), (2), and (3) will substantially remain constant for a particular negative area and a particular voltage applied across the charging circuit, all other factors being equal and constant, such as capacitance and illumination. However, in order to satisfactorily expose duplicating materials of different exposure characteristics, it may be desirable to vary the exposure time associated with a particular negative transimissivity from one duplicating material to another. To accomplish this, the voltage applied across the charging circuit is varied selectively. This voltage is represented in FIG. 6 by variable voltage source 160 which has its negative terminal connected to one plate of the capacitor C1 and its positive terminal grounded. By varying this voltage, the satisfactory exposure time for a particular type of duplicating material may be obtained.

Reviewing the condition of the printer apparatus to this point, it is understood that the negative area 22 and the duplicating material area 24 are in contact by way of the inflated air bag 60 (FIG. 2), and the exposure lamp 70A is at color temperature to effect proper exposure illumination for the duplicating material area 24. As this illumination is detected by the photocell 145A, the potential on the capacitor C1 approaches a specific voltage level which indicates that the exposure is complete and satisfactory for the particular negative area involved. This voltage level is referred to as the exposure limit voltage level.

The voltage level on the capacitor C1 is coupled to the base electrode 250 of the NPN transistor Q2 which was initially in a non-conducting state. The transistor Q2 is biased in its conduction region when the capacitor voltage reaches the exposure limit voltage level. This conduction effects the biasing of the NPN transistor Q1 in its conduction region. As the transistor Q1 begins conducting current, the voltage drop across its emitter circuit resistor 252 back biases the diode 253 in the emitter circuit of the initially conducting transistor Q3 thereby terminating the conduction of this transistor.

The current conducted by the transistor Q1 also provides a suitable voltage drop across the resistor 203 in the base circuit of the initially conducting transistor Q4 thereby biasing this transistor in its non-conduciton region.

At this point the potential of the emitter electrode 207 of the transistor Q4 goes to the potential of $-V_1$ applied at the terminal 209 thereby biasing the Zener diode 239. With the Zener diode 239 back biased, the potential at the base electrode 238 of the transistor Q7 goes to the potential of $-V_1$ applied at the terminal 242 thereby biasing this transistor in its non-conduction region. When the transistor Q7 ceases conduction, the base current to the base electrode 254 of the transistor Q8 becomes such as to render this transistor non-conducting. With the transistor Q7 in a state of non-conduction, the exposure lamp 70A is connected effectively in series with the high resistance of the resistor R1 and the lamp is extinguished.

Also as the transistor Q4 ceases conduction, the bias on the base electrode 255 of the PNP transistor Q6 becomes suitably negative to bias this transistor in its conduction region. The current conducted by this transistor Q6 supplies charging current to capacitor C1 and prevents the voltage level on this capacitor C1 from falling below the exposure limit voltage level and prematurely energizing exposure lamp 70A.

When the exposure lamp 70A is extinguished, the voltage at the collector electrode 201 of the transistor Q8 becomes substantially the same as the voltage applied at terminal 202 since little or no current is flowing through the exposure lamp. Therefore, this diode CR1 detects this voltage as an indication that lamp 70A is extinguished and functions, in effect, as one input of an AND gate. As the last one of the exposure lamps is extinguished by its respective dodging circuit, the last input to this AND gate is enabled and a signal is received by the machine control circuit 210 representative of this condition of the lamps. When this signal is received by the machine control circuit 210, it de-energizes relays K1 and K2 permitting relay arms 217, 219, 225, and 230 to return to their normal positions (as shown in FIG. 6).

As relay arms 219, 230, and 225 return to their normal positions the capacitor C1 discharges through the resistor 244 and the diode 245 and the negative voltage from the negative side of the variable voltage source 160 biases the transistors Q2 and Q1 in their non-conduction regions thereby permitting the transistors Q3 and Q4 to resume their initial conduction states.

As relay arm 217 returns to its normal position, machine control circuit 210 terminates its command signal to the valve control apparatus 62 associated with the air bag 60 (FIG. 2) and this bag is deflated. The exposure cycle is then complete and another exposure may be made.

It is readily understood that if the negative area 22 was actually opaque or had a very low transmissivity, the exposure time for the corresponding duplicating material area 24 may be very long, or even indefinite. In the case of an opaque negative area, the exposure lamp associated with this area will never be turned off by the circuit described above. To compensate for this, a conventional timer circuit 212 may be provided in operable connection with the machine control circuit 210 to automatically extinguish those exposure lamps which are still illuminating, at the expiration of the time selected at the timer circuit 212.

This timer circuit 212 may be provided with a manual time selector so that an operator can choose any of a range of times. With such manual selectivity of maximum exposure times, the manual switch 260 in FIG. 6 connecting relay control circuit 215 and the time delay circuit 220 permits exposure of a duplicating material for any desired time. This is more clearly seen when it is understood that, by disconnecting the relay K1 from the machine control circuit 210, the charging of the capacitor C1 is prevented. Therefore, the exposure lamp 70A is illuminating only until the expiration of the time selected at the timer circuit 212. In this manner, the operator can select any suitable exposure time at the timer circuit 212 and open switch 260, then activate machine control circuit 210 to effect an exposure for the selected time.

Above is described an automatic dodging system for a contact printer by which exposure of a negative to be reproduced is accomplished both simply and automatically. The unique manner in which interconnecting incremental areas of illumination are provided on the negative enable proper dodging to be effected electronically. Thus, the dodging may be accomplished without the need for evaluation of the negative as done heretofore. Furthermore, the automatic dodging control can accommodate various film sensitivities. Hence, high quality prints may be made both rapidly and simply without the need of complicated adjustments or mere guesswork.

While the invention has been described with reference to the circuit and apparatus disclosed herein, it is not confined to the details set forth since it is apparent that certain electrical and mechanical equivalents may be substituted for elements of the preferred circuit and apparatus without departing from the scope of the invention.

Thus, for example, the capacitor C1 could be replaced by a variable capacitor or a bank of selectable capacitors to achieve varying exposure times compatible with the characteristics of the particular duplicating material used.

Another modification of the circuit of FIG. 6 would be to connect the photocell 145A in the base bias circuit of the transistor Q5.

While transistors have been shown throughout this circuit, other types of controlled semiconductors could be used where suitable.

Therefore, it is intended to cover such modifications or changes as may come within the scope of the invention as defined by the following claims:

What is claimed is:
1. A recording apparatus comprising:
 (a) means to support an illumination sensitive duplicating material in an overlying relation with an image transparency to be reproduced coextensive with a printing zone;
 (b) a plurality of exposure sources positioned on the side of said printing zone nearer said image transparency to direct exposing illumination onto said transparency in said printing zone;
 (c) optical means positioned intermediate said sources and said printing zone to transmit said exposing illumination from each of said sources to said printing zone in predetermined incremental areas;
 (d) a plurality of photosensitive elements each in spatial alignment with one of said sources and positioned relative to an incremental area of said duplicating material to receive illumination passing therethrough;
 (e) time constant circuit means coupled to a source of voltage, said time constant circuit means including:
  (1) one of said photosensitive elements, and,
  (2) capacitive means for providing a stored voltage which is a function of the transmissivity value of an area of said image transparency substantially coextensive with said incremental area of said duplicating material; and,
 (f) control means individually coupled between each of said exposure sources and said time constant circuit means and responsive to a predetermined level of said stored voltage to prevent the direction of said exposing illumination of said printing zone from said each of said exposure sources.

2. A recording apparatus according to claim 1 including clamping means for selectively clamping said capacitive means to a predetermined voltage.

3. A recording apparatus according to claim 1 wherein said source of voltage is selectively variable.

4. A recording apparatus as defined in claim 1 wherein adjacent ones of said predetermined incremental areas overlap one another.

5. A recording apparatus comprising:
 (a) means to support coextensively with a printing zone an illumination sensitive duplicating material in an overlying relation with an image transparency to be reproduced;
 (b) a plurality of exposure sources positioned to direct exposing illumination to said printing zone;
 (c) optical means positioned intermediate said sources and said printing zone to transmit said exposing illumination from each of said sources to said printing zone in predetermined incremental areas, adjacent ones of said incremental areas overlap each other;
 (d) a plurality of photosensitive elements each in spatial alignment with one of said sources and positioned relative to an incremental area of said image transparency to receive illumination passing therethrough; and,
(e) control circuit means coupled between each of said photosensitive elements and each of said sources to individually prevent the direction of said exposing illumination from each of said sources to said printing zone after a variable predetermined time indicative of the transmissivity value of said incremental area of said transparency.

6. A recording apparatus comprising:
(a) means to support at a printing zone an illumination sensitive duplicating material in an overlying relation with an image transparency to be reproduced;
(b) a plurality of exposure sources positioned on the side of said printing zone nearer said image transparency to direct exposing illumination to said printing zone;
(c) optical means positioned intermediate said sources and said printing zone to transmit said exposing illumination from each of said sources to said printing zone in predetermined incremental areas;
(d) a plurality of photosensitive elements each in spatial alignment with one of said sources and positioned relative to an incremental area of said duplicating material to receive illumination passing therethrough;
(e) time constant circuit means coupled to a source of voltage, said time constant circuit means including:
  (1) one of said photosensitive elements, and,
  (2) capacitive means for providing a stored voltage which is a function of the transmissivity value of an area of said image transparency substantially coextensive with said incremental area of said duplicating material;
(f) control means individually coupled between each of said sources and said time constant circuit means and responsive to a predetermined level of said stored voltage to prevent the direction of said exposing illumination to said printing zone;
(g) switch means to initiate the direction of said exposing illumination to said printing zone when actuated and to prevent said direction when deactuated;
(h) timing means coupled to said control means for selectively preventing the direction of said exposing illumination to said printing zone from said plurality of sources after a predetermined time following the actuation of said switch means; and,
(i) logic means coupled to said switch means and responsive to the illuminating condition of said plurality of sources to deactuate said switch means when said plurality of sources are not directing said exposing illumination to said printing zone.

7. A recording apparatus comprising:
(a) means to support a light sensitive duplicating material having a predetermined range of light sensitivity in an overlying relation with an image transparency to be reproduced coextensive with a printing zone;
(b) a plurality of uniformly spaced-apart illumination sources positioned on the side of said printing zone nearer said image transparency to direct exposing illumination to said printing zone, said exposing illumination being substantially within said predetermined range;
(c) optical means positioned intermediate said sources and said printing zone to transmit said exposing illumination from each of said sources to said printing zone in predetermined incremental areas;
(d) a plurality of photosenstive elements each in spatial alignment with one of said sources and positioned relative to an incremental area of said image transparency to receive illumination passing therethrough;
(e) time constant circuit means coupled to a variable source of voltage and including,
  (1) one of said photosensitive elements, and,
  (2) capacitive means for providing a stored voltage which is a function of the transmissivity value of said incremental area of said image transparency;
(f) control means individually coupled between each of said sources and said time constant circuit means and responsive to a predetermined level of said stored voltage to prevent the direction of said exposing illumination to said printing zone; and,
(g) means to selectively clamp said capacitive means to a predetermined voltage.

8. A recording apparatus as defined in claim 7 wherein said optical means includes an illumination diffusive member positioned relative to said illumination sources to cause adjacent ones of said predetermined incremental areas to overlap each other.

9. A recording apparatus comprising:
(a) means to support at a printing zone a light sensitive duplicating material having a predetermined range of light sensitivity in an overlying relation with an image transparency to be reproduced;
(b) a plurality of uniformly spaced-apart illumination sources positioned on the side of said printing zone nearer said image transparency to direct exposing illumination to said printing zone, said exposing illumination being substantially within said predetermined range;
(c) optical means positioned intermediate said sources and said printing zone to transmit said exposing illumination from each of said sources to said printing zone in predetermined incremental areas;
(d) a plurality of photosensitive elements each in spatial alignment with one of said sources and positioned relative to an incremental area of said duplicating material to receive illumination passing therethrough;
(e) time constant circuit means coupled to a variable source of voltage and including,
  (1) one of said photosensitive elements and,
  (2) capacitive means for providing a stored voltage which is a function of the transmissivity value of an area of said image transparency substantially coextensive with said incremental area of said duplicating material;
(f) control means individually coupled between each of said sources and said time constant circuit means and responsive to a predetermined level of said stored voltage to prevent the direction of said exposing illumination to said printing zone;
(g) means to selectively clamp said capacitive means to a predetermined voltage;
(h) said support means includes an inflatable pressure means to urge said duplicating material and said transparency into said overlying relation when inflated, said pressure means being of a material and color as to substantially pass only that illumination outside said range of sensitivity of said duplicating material; and,
(i) said optical means includes a diffusion screen, a plurality of lenses supporting in overlying relation with said screen, and collimating honeycomb-like structure positioned intermediate said lenses and said printing zone.

10. A recording apparatus according to claim 9 including additionally:
(a) switch means to initiate the direction of said exposing illumination to said zone when actuated; and,
(b) timing means coupled to said control means for selectively preventing the direction of said exposing illumination to said printing zone from said plurality of sources after a predetermined time following the actuation of said switch means.

11. A recording apparatus comprising:
(a) means to support at a printing zone a light sensitive duplicating material in an overlying relation with an image transparency to be recorded;

(b) inflatable pressure means to urge said duplicating material and said transparency into said overlying relation when in an inflated state;
(c) valve control means to selectively inflate said pressure means in response to an inflate signal;
(d) a plurality of uniformly spaced-apart light sources positioned on the side of said printing zone nearer said transparency to direct exposing light to said printing zone;
(e) optical means positioned intermediate said sources and said printing zone to transmit said exposing light from each of said sources to said printing zone in predetermined incremental areas;
(f) switch means to selectively initiate the direction of said exposing light to said printing zone when actuated;
(g) a plurality of photosensitive elements each in spatial alignment with one of said sources and positioned relative to an incremental area of said duplicating material to receive light passing therethrough;
(h) time constant circuit means coupled to a variable source of voltage and including;
   (1) one of said photosensitive elements, and
   (2) capacitive means for providing a stored voltage which is a function of the transmissivity value of an area of said transparency substantially coextensive with said incremental area of said duplicating material;
(i) voltage sensitive means individually coupled between each of said sources and said time constant circuit means and responsive to a predetermined level of said stored voltage to prevent the direction of said exposing light to said printing zone from said one of said sources;
(j) control means to generate an inflate signal;
(k) means for coupling said inflate signal to said valve control means;
(l) actuating means coupled to said control means to actuate said switch means a predetermined time after the generation of said inflate signal;
(m) clamp means for clamping said capacitive means to a predetermined voltage during a predetermined interval of time after the actuation of said switch means;
(n) timing means coupled to said control means for selectively preventing the direction of said exposing illumination to said printing zone from said plurality of sources after a predetermined time following the actuation of said switch means.

12. A recording apparatus comprising:

(a) means to support at a printing zone an illumination sensitive duplicating material in an overlying relation with an image transparency to be reproduced;
(b) a plurality of exposure sources positioned on the side of said printing zone nearer said image transparency to direct exposing illumination to said printing zone;
(c) optical means positioned intermediate said sources and said printing zone to transmit said exposing illumination from each of said sources to said printing zone in predetermined incremental areas;
(d) a plurality of photosensitive elements each in spatial alignment with one of said sources and positioned relative to an incremental area of said duplicating material to receive illumination passing therethrough;
(e) time constant circuit means coupled to a source of voltage, said time constant circuit means including:
   (1) one of said photosensitive elements, and,
   (2) capacitive means for providing a stored voltage which is a function of the transmissivity value of an area of said image transparency substantially coextensive with said incremental area of said duplicating material;
(f) control means individually coupled between each of said sources and said time constant circuit means and responsive to a predetermined level of said stored voltage to prevent the direction of said exposing illumination to said printing zone; and,
(g) means coupled to said capacitive means and said control means to maintain said stored voltage at least at said predetermined level substantially when the direction of said exposing illumination from said one of said sources to said printing zone is prevented and for a predetermined interval of time thereafter.

References Cited

UNITED STATES PATENTS

| | | | |
|---|---|---|---|
| 2,953,984 | 9/1960 | Hofstetter | 95—75 |
| 3,011,395 | 12/1961 | Folse | 88—24 |
| 3,178,999 | 4/1965 | Clapp | 88—24 |
| 3,320,867 | 5/1967 | Miller | 95—75 |

NORTON ANSHER, Primary Examiner

F. L. BRAUN, Assistant Examiner

U.S. Cl. X.R.

355—68, 70, 83